United States Patent [19]

Carpenter

[11] Patent Number: 5,210,604
[45] Date of Patent: May 11, 1993

[54] METHOD AND APPARATUS FOR AUDIENCE PARTICIPATION BY ELECTRONIC IMAGING

[76] Inventor: Loren C. Carpenter, 82 Queva Vista, Novato, Calif. 94947

[21] Appl. No.: 806,051

[22] Filed: Dec. 10, 1991

[51] Int. Cl.⁵ .............................................. H04N 7/18
[52] U.S. Cl. ..................................... 358/93; 358/903; 359/169
[58] Field of Search ................. 358/93, 107, 108, 903; 364/409; 359/169

[56] References Cited

U.S. PATENT DOCUMENTS

| | | | |
|---|---|---|---|
| 4,249,207 | 2/1981 | Harman | 358/108 |
| 4,396,945 | 8/1983 | DiMatteo | 358/107 |
| 4,555,724 | 11/1985 | Enriquez | 358/107 |
| 5,001,557 | 3/1991 | Begle | 358/93 |

Primary Examiner—Howard W. Britton
Attorney, Agent, or Firm—Skjerven, Morrill, MacPherson, Franklin & Friel

[57] ABSTRACT

An audience response system in which each audience member is provided with a reflective device which is, for example, green on one side and red on the other side. Light from a floodlight is reflected from the reflectors and imaged by a conventional video camera. A computer receives the digitized and processed image, forms a map of the audience, and distinguishes the red from the green reflections. This data is then used by the computer to project an image onto a screen visible to the audience, the image being controlled by the red or green image reflections. The audience thus jointly controls the screen image, for instance for purposes of voting or playing a game.

15 Claims, 6 Drawing Sheets

METHOD AND APPARATUS FOR AUDIENCE PARTICIPATION BY ELECTRONIC IMAGING

MICROFICHE APPENDIX

This disclosure includes a computer program in the form of a microfiche appendix having 1 fiche and a total of 65 frames.

BACKGROUND OF THE INVENTION

1. Field of the Invention

This invention relates generally to the arts of computer graphics and electronic image processing, and more specifically to the field of human-computer interface techniques for a group (one or more) of people simultaneously interfacing to one computer.

2. Description of the Prior Art

Much work has been done in recent years to facilitate the one-on-one interaction of a human and a computer. This interaction is bidirectional, human-to-computer and computer-to-human. The present invention relates to the human-to-computer direction.

Devices commonly available for this purpose include computer keyboards, mouse, light pen, trackball, microphone, and, through the MIDI communication channel, a wide variety of musical instruments. In a situation where more than one person wishes to communicate to a computer simultaneously, as in, for example, the case of an audience controlling the course of a movie story, prior art has little to offer. The only techniques available fall into two similar categories: wired seats and radio transmitters.

Wired seats refers to the placement, at several or all seats in a room, of some kind of electronic signalling device consisting variously of buttons, switches, dials, etc. These devices are connected via wires to a computing or tabulating device which registers the actions made by the people occupying the seats. This method is often used to tabulate votes in legislative bodies, and to record subject reactions in the testing of television commercials. It, of course, requires significant advance preparation of the room, which may not be convenient or possible in many cases.

The laying of wires in the room can be avoided by the second prior art method, wireless communication. Here, the seats, or the people individually or in groups, are provided with signalling devices connected to a radio or infrared transmitter. Some form of multiplexing is employed to keep all the signals separated. The wireless method has the advantage that no wires need to be run, and, in addition, the people may be free to mill about in the area, not being confined to their seats. This method has the disadvantage of cost, transmitters and receivers costing far more than wires, with the attendant potential losses if transmitters are handed out to members of an audience. Also there are practical limits to the number of simultaneously transmitting devices, especially if low cost and/or low power are considerations.

SUMMARY OF THE INVENTION

It is a general object of the present invention to provide a technique whereby one or a great number of people may simultaneously communicate information to a computer, using simple devices of minimal cost.

This and additional objects are accomplished by the present invention wherein each member of an audience is equipped with a retroflective device each one of which is illuminated by one lamp and viewed by one video camera, substantially coaxially aligned with the lamp, the signal from the video camera being analyzed and acted upon by a computer.

Thus in accordance with the invention an audience response system is provided in which each audience member is provided with a reflective device which is for instance green on one side and red on the second side. Light from a source of light is reflected from the individual reflectors and imaged by a conventional video camera. A computer connected to each camera via a frame grabber forms a map of the audience and distinguishes the individual red from green reflections. This red and green reflection image data is then processed by the computer and used, for instance, for voting by the audience and/or to project an image onto a screen visible to the audience, the image being controlled in terms of some particular parameter by the number and/or location of the red or green image reflections which are aggregated by the computer.

In an alternate variation of the invention, members of the audience are equipped with self powered sources of illumination (such as flashlights), the video image of which is analyzed by the computer in an identical manner.

DETAILED DESCRIPTION OF THE INVENTION

Figure 1:
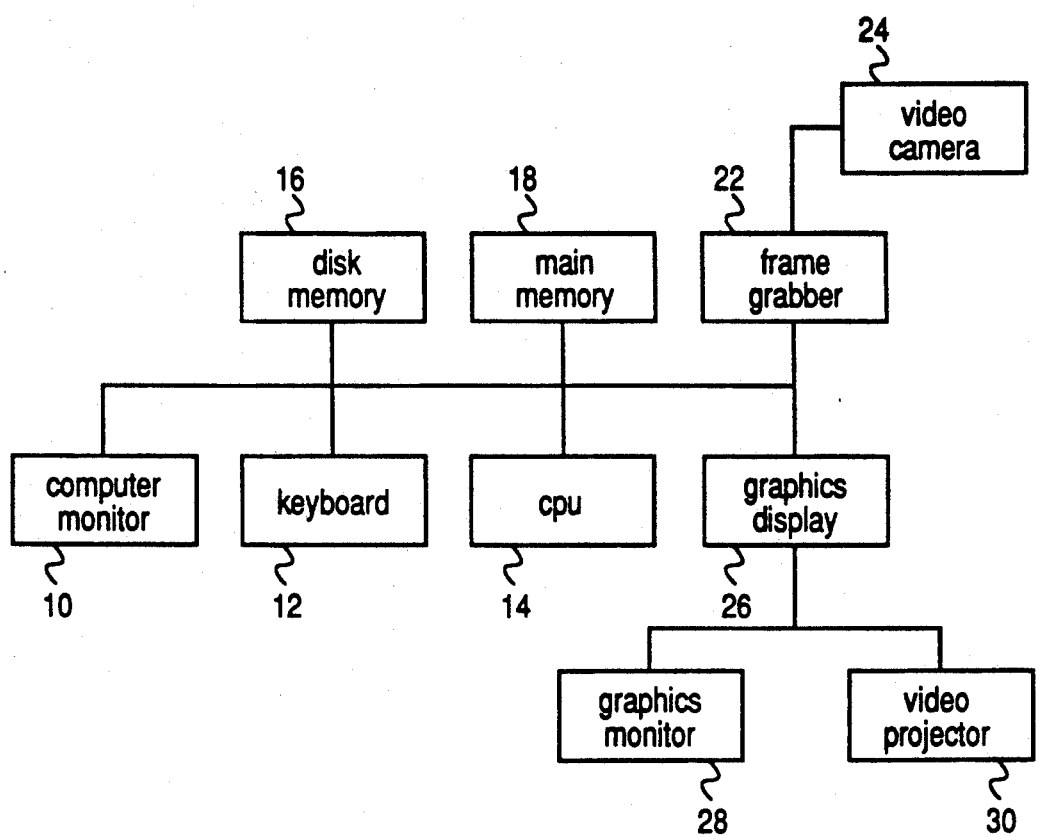
FIG. 1 shows the operator station and related portions of a system in accordance with the invention.

FIG. 1 shows the operator control station and associated portions of a system in accordance with the invention. A conventional personal computer includes monitor 10, keyboard 12, CPU 14 (central processing unit), disk 16, and main memory 18. Provided as a conventional add-on board to the computer is a conventional video frame grabber 22 such as the commercially available model AT-Vista from TrueVision, Inc. Frame grabber 22 accepts conventional video data from a conventional color RGB or composite video camera 24. Other output modes in accordance with the invention include a computer controlled laser video disk playing a movie or a multimedia file under the control of the audience, or MIDI, or other modes of feedback to the audience.

Also connected to the computer is a graphics display control unit 26 such as a standard VGA adapter card which provides images generated by the CPU 14 to a conventional graphics monitor 28 and a conventional video projector 30.

Figure 2A:
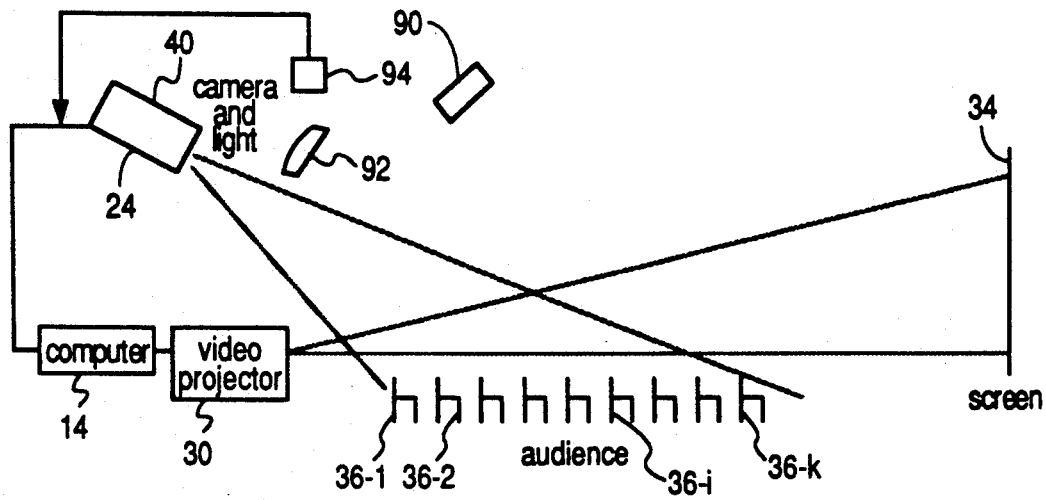
FIGS. 2a, 2b and 2c show the system of FIG. 1 in use.

As shown in FIG. 2a, the video projector 30 conventionally projects images from the computer CPU 14 onto a screen 34 for viewing by members of an audience who are sitting, for instance, in an auditorium on chairs 36-1, 36-2, 36-3, ..., 36-i, ..., 36-k, Only some of which are shown. It is understood that the audience is filling or partially filling the auditorium, and need not be seated; chairs 36-1, ..., 36-k merely represent locations of the members of the audience. A light source 40 (such as a floodlight) is coaxially mounted with video camera 24, which is mounted so as to receive light reflected from retro reflectors (not shown) held by each audience member in seats 36-1, ..., 36-k. The light preferably illuminates just what the camera images and no more.

Figure 2B:
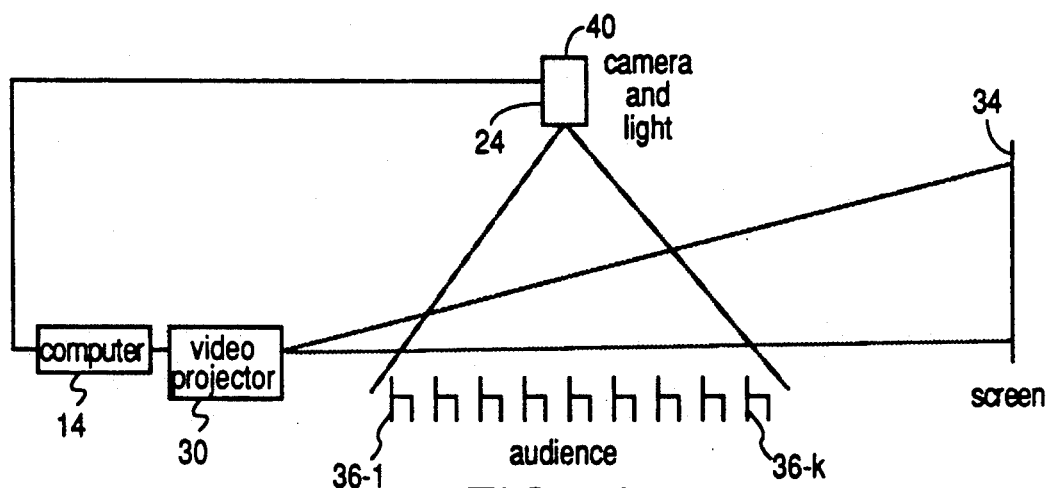
Figure 2C:
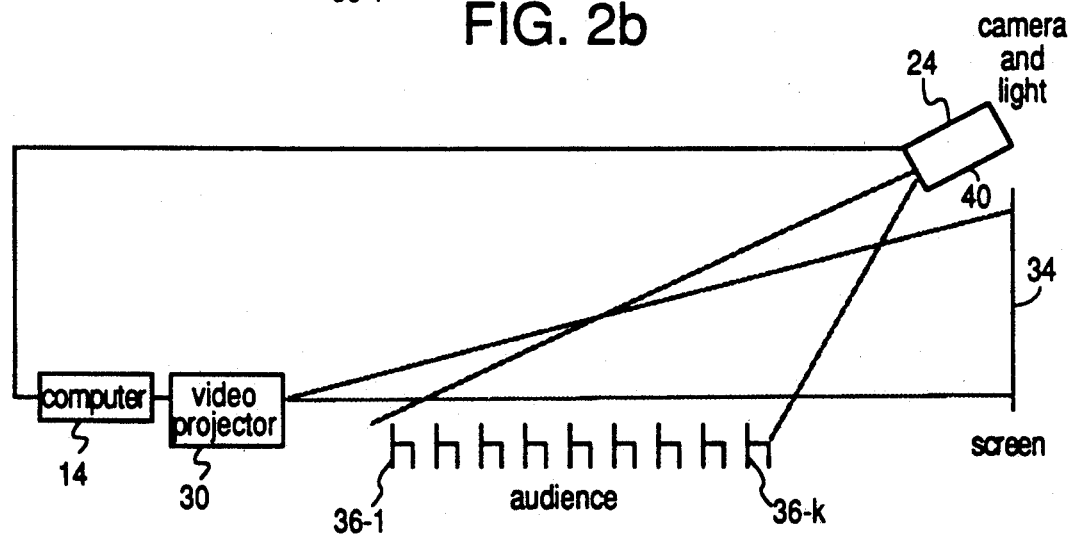

The overall setup is as shown therefore in FIG. 2a, although alternative setups as shown in FIG. 2b and FIG. 2c with camera 24 and light source 40 located as shown can be used with no other changes.

Members of the audience are each equipped with a retroreflecting device. These retroreflecting devices in one version are constructed by applying adhesive backed retroreflecting tape (commercially available from 3-M or Reflexite Corp.) to a small flat stick of wood or stiff paperboard. Such tape returns a reflection only towards the incident light source, thus the requirement for colocating the light and camera when retroreflectors are used. In one version, about six square inches each of red and green tape (each measuring about 2"×3") are applied respectively to opposite sides of one end of the stick. In the preferred embodiment the auditorium is darkened like a movie theater.

This configuration allows each participating person in the audience to signal by holding up the stick, with the retroreflecting tape in view of the video camera(s).

Figure 3:
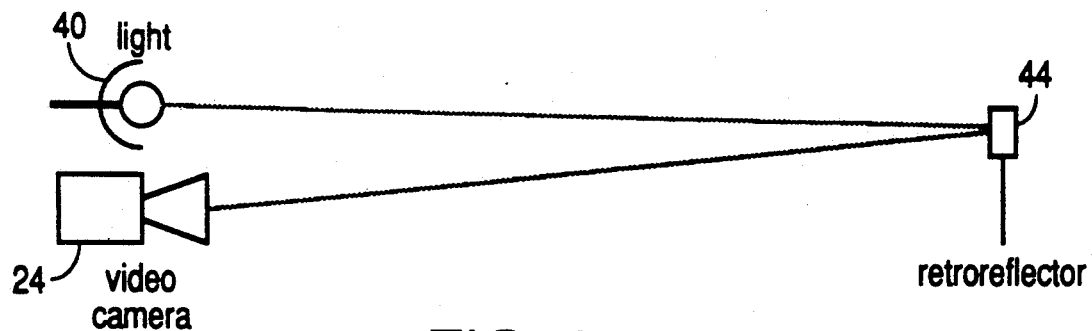
FIG. 3 shows reflection of light in accordance with the invention.

FIG. 3 shows the relationship between the light source 40, one such retroreflecting device 44, and the video camera 24. A simple turn of the wrist by the person holding the retroreflecting device 44 is sufficient to change the state of the signal value observed by camera 24 by changing from the red side of device 44 being towards the camera 24 to the green side of device 44 being towards the camera 24.

Figure 4:
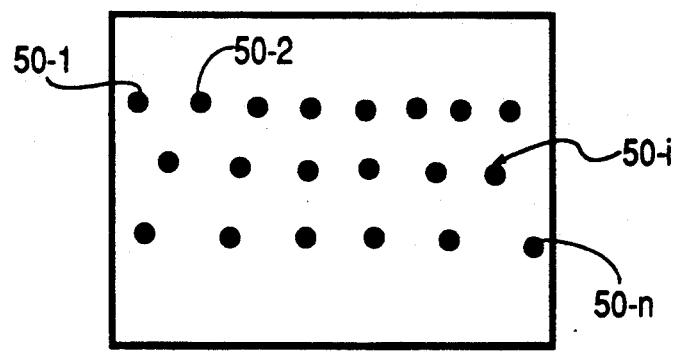
FIG. 4 shows a camera image in accordance with the invention.

A typical image of an audience as seen by the video camera 24 is shown in FIG. 4. If the auditorium (stadium, etc.) is large, several video camera 24/light source 40 combinations (see FIG. 3) are disposed at convenient locations around the auditorium, so as to cover the entire audience. The number of camera 24/light source 40 combinations, the size of each reflector 44, and the ambient room light level may be varied so as to achieve a satisfactory image at camera 24 to enable each reflecting device to be imaged. The image (FIG. 4) consists of a varying number of colored dots, 50-1, 50-2, 50-3, ..., 50-i, ..., 50-n, generally moving slightly, each colored dot being the image of one reflector. Software resident in the computer analyzes this time-dependent imagery to determine the state of each of the audience members, reflectors. The video camera's perspective transformation matrix describes how reflectors in the room are transformed into points 50-1, ..., 50-n in the video image. This matrix is derived for each camera 24 when it is emplaced, before use with the audience. A computer program for performing this process is shown in the microfiche appendix which is part of this disclosure. The computer program is in the C language and annotated with comments explaining operation thereof.

Derivation of the matrix in the program is done via a least-squares technique by associating the known locations of specially located reflectors in view of the camera(s), with the resulting positions of said reflectors in the video image(s) of each camera 24. The correspondence so derived allows one to predict the location in the video image of any point (i.e., each seat 36-1, ..., 36-k) within the view of the camera 24. Given the layout of the seats 36-1, ..., 36-k in the auditorium and the probable offset of a typical reflector from the associated seat, the transformation matrix permits the computation of the pixel location of each audience member's reflector in the video image of the audience.

Figure 5:
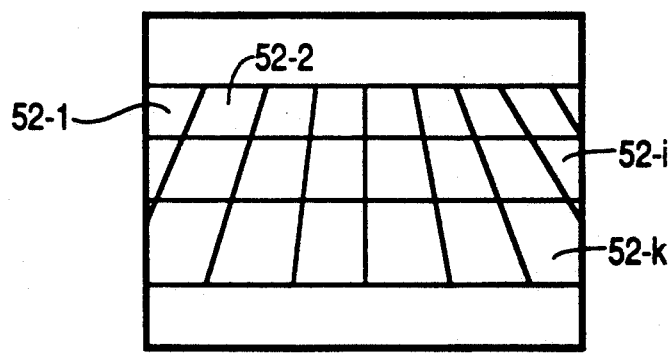
FIG. 5 shows a grid pattern for analyzing light reflection.

Alternatively, the seat geometry matrix may be overlaid with a sampling mesh (see FIG. 5), with each cell 52-1, 52-2, ..., 52-i, ..., 52-k the size of approximately the dimensions of one or more seats. This alternative may also be used where no seats are present (the audience is milling around), or if the seating geometry is not available to the computer.

Given the probable location of the expected dots (see FIG. 4) in the video image of each video camera in a large auditorium where several cameras are used, each seat may be assigned to a camera capable of the best view, e.g. the dot is closest to the center of the image for that camera.

Figure 6:
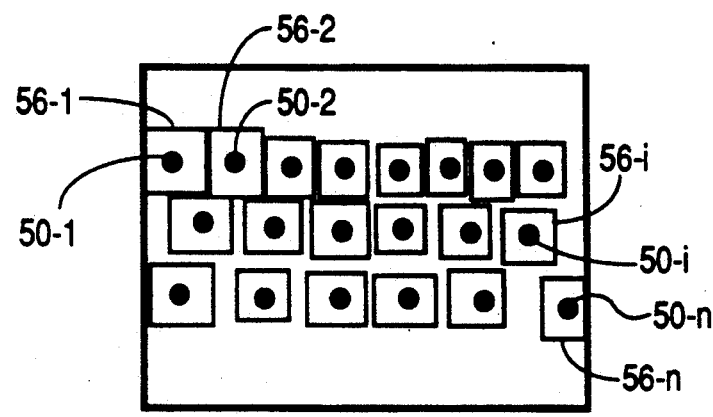
FIGS. 6 and 7 show polygons for defining image locations.
Figure 7:
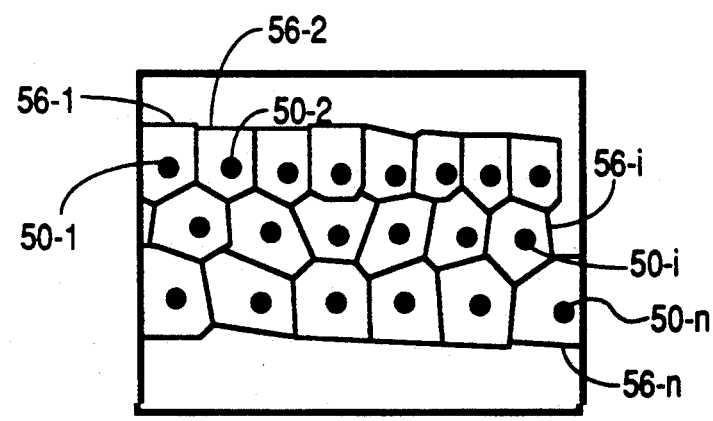

Also, given the probable location of the dots in the video image, a polygon, rectangular or otherwise, can be defined surrounding the dot in the video image. FIGS. 6 (rectangles) and 7 (Voronoi polygon tiling) show exemplary configurations of such polygons 56-1, 56-2, ..., 56-i, ..., 56-n. FIG. 6 shows rectangular polygons 56-1, ..., 56-n; FIG. 7 shows voronoi polygon tiling 56-1, ..., 56-n. Given the polygon definitions, the computer then continuously sums the digital values inside each polygon 56-i in the image, for each color. The resulting sums indicate the relative amount of each color emanating from the region surrounding the probable location of a reflector held by a participant. If the sums are greater than a predefined threshold, a simple test of relative magnitude can determine the color of a participant's reflector.

If the sums are all below the threshold, the participant is deemed to be sending no signal. The states of the participants' reflectors are then made available to the other subsystems of the computer system.

Figure 9A:
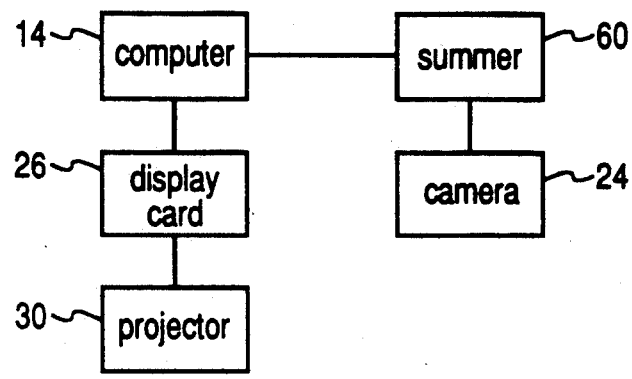
FIGS. 9a and 9b show two methods of using the polygon summing circuit of FIG. 8.
Figure 9B:
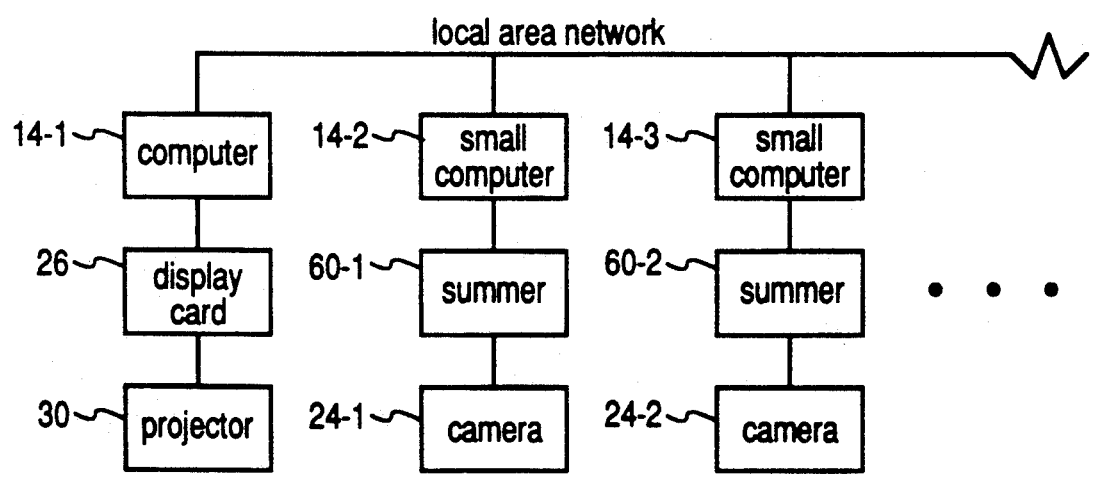

In another embodiment, rather than processing the above-described polygon 56-1, ..., 56-n definitions by computer software, instead a circuit implementation is provided for faster processing, i.e., faster response time, to changes in the reflector states. This circuit replaces the frame grabber 22 in the system of FIG. 1. Its function is to act as a frame grabber and data concentrator to reduce the volume of input data. It allows the host computer to be free to perform other tasks such as generating images or music. FIGS. 9a and 9b (described below) show two methods of using the summing circuit. This circuit advantageously provides a response time with only a two video frame time delay, i.e., approximately 1/15th of a second or less. This "polygon summing" circuit in one version is a board conventionally installed in the computer central processing unit 14 or may be a stand-alone unit.

Figure 8:
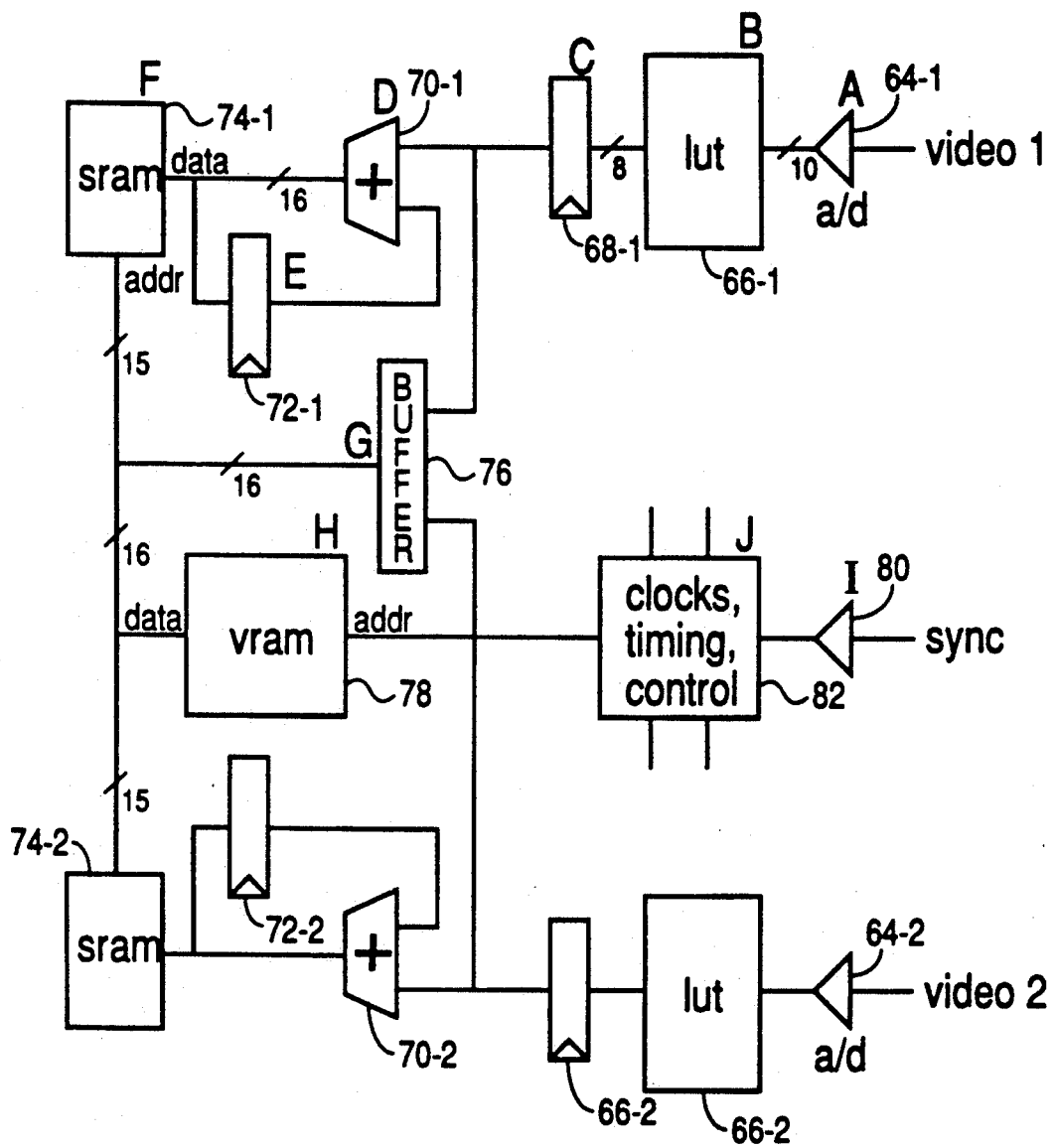
FIG. 8 shows a polygon summing system in accordance with the invention.

The polygon summing circuit is shown as a block diagram in FIG. 8. There are two video channel inputs video 1, video 2. Video 1 would be, for instance, for the red color image detected by the video camera and video 2 would be for instance the green color image detected by the video camera. These images video 1 and video 2 are each digitized respectively by 10-bit analog to digital converter 64-1, 64-2 and then each processed respectively by a static RAM look-up table (lut) 66-1, 66-2 to form 8-bit data, to overcome any nonlinearities in the video input signal and to compensate for illumination color imbalances, camera gain differences, and reflector efficiency differences.

The circuit operates at any one time in one of two modes. The first mode is continuously digitizing and storing the two channels of video. The second mode is, for each of the two channels, summing polygons defined in their frames.

The digitizing mode operates in the following manner. At the beginning of a frame as determined by sync stripper 80, and clocks, timing, and control circuitry 82, addresses for the VRAM (video RAM) 78 are reset to the beginning of the frame. VRAM 78 is 1024×512×16-bits. For each pixel and each scan line, the control circuit 82 causes the following to happen in this sequence: analog to digital converters 64-1, 64-2 each clocks its value out respectively to look-up table 66-1, 66-2, each of which converts the digital value to 8 bits. Each 8-bit latch 68-1, 68-2 holds the output respectively of look-up table 66-1, 66-2. Sixteen bit buffer 76 connects the output of both latches 68-1 and 68-2 to the serial port of VRAM 78.

The control circuitry 82 presents the address and write strobe to VRAM 78 and the pixels from buffer 76 are stored therein. The control circuitry 82 increments the VRAM 78 address. At that time, the host computer (which is connected thereto by a host computer interface with read-write access to all memories) can read the pixels in the VRAM 78 through the VRAM 78 random access port (not shown).

The polygon summing mode of the circuit of FIG. 8 operates in the following manner. At the beginning of a frame as determined by sync stripper 80 and control circuitry 82, the addresses for VRAM 78 are reset to the beginning of the frame. For each pixel and each scan line, the control circuit 82 causes the following to happen in this sequence. Each analog to digital converter 64-1, 64-2 clocks its value out. Each look-up table 66-1, 66-2 converts the received digitized value to 8 bits. Each latch 68-1, 68-2 holds the output respectively of look-up table 66-1, 66-2.

Control circuitry 82 presents the address and read strobe to VRAM 78 and a polygon number is read out of the serial port of VRAM 78.

Each SRAM (static RAM) 74-1, 74-2 stores two banks of 32K 16-bit words. Each SRAM 74-1, 72-2 uses the read out polygon number as its address. The word in SRAMs 74-1, 74-2 at this address is read out respectively into latches 72-1, 72-2, each of which is a 16-bit latch. Each 16-bit adder 70-1, 70-2 computes the sum of the converted pixel respectively in latch 68-1, 68-2 and the partial sum in latch 72-1, 72-2. The sum from each adder 70-1, 70-2 is written back respectively into SRAM 74-1, 74-2 at the same address from which it was read. Control circuitry 82 increments the VRAM 78 address.

At the end of each frame the following happens in this sequence: SRAM 74-1, 74-2 banks are switched by control circuitry 82. The host computer (not shown) reads the contents of the previously updated bank of each SRAM 74-1, 74-2. The host computer then zeroes the contents of the previously updated bank of each SRAM 74-1, 74-2. The VRAM 78 is previously set-up to contain a polygon index for every pixel in the frame. Thus rectangles (or alternatively Voronoi tessellations) are easily supported for defining the cells as shown in FIGS. 6 and 7.

In use the circuit of FIG. 8 operates as follows. First, it is operated in the above-described digitizing mode, with both lut's 66-1 and 66-2 containing a straight linear mapping of 10 onto 8 bits. Color calibration targets are placed so as to be in view of the camera and illuminated by whatever lights will be used with the audience. Video frames are digitized and read out by the host computer. The host computer determines adjustments to the lut's 66-1, 66-2 required to compensate for any imbalances in color response.

Second, the system is operated again in digitizing mode, this time with the corrected tables loaded in lut's 66-1, 66-2. During this phase, video frames are captured of calibration reflectors located in the room, i.e., nominal reflectors used to set up and aim each of the cameras by imaging their reflections. The host computer reads out the images of the calibration reflectors and finds the location in the images of the colored dots made by the reflectors. Then, these locations are matched with the measured physical locations of the corresponding reflectors located in the room. Together, this provides sufficient information to compute the transformation matrix for the camera. This matrix allows the computer to predict where in the camera image the dot from an audience member is likely to be found. Sampling cells are derived surrounding the expected locations of these dots. Each sampling cell is numbered. The numbers of these cells are stored in the VRAM 78, with each VRAM 78 pixel being associated then with a particular cell number. For instance the cells are as shown in FIG. 6 or 7. As the digitized pixel data from the video camera arrives in latches 68-1, 68-2, corresponding information is extracted from VRAM 78 indicating the cell number assigned to that particular pixel. Thus a unique identifier is provided for each cell and identification of each pixel with a particular cell is achieved.

After completion of these calibration phases, the system is used in conjunction with actual audience participation in the above-described summing mode For each incoming pixel, the 15 data bits identifying the associated cell are clocked out and serve as an address for the SRAMs 74-1, 74-2 from the VRAM 78. In this example, 15 bits are chosen so as to allow use with a large audience, i.e., up to 32,768 people (cells) for 15 bits. The SRAMs 74-1, 74-2 are each then accessed and the data from the SRAMs 74-1, 74-2 goes respectively to latches 72-1, 72-2. Thus there is a read/modify/write cycle of the SRAMs 74-1, 74-2 for each of the up to 32,768 cells in the audience. There are two banks of static RAM in each SRAM 74-1, 74-2 with each frame swapped between the two banks. At the end of each video frame as identified by sync stripper 80 and control circuitry 82, the bank of each SRAM 74-1, 74-2 just accessed notifies the host computer to switch to the other static RAM bank. Thus the sum of the polygons (cells) is read out and that particular static RAM bank is cleared, i.e., returned to zero. The data from the SRAMs 74-1, 74-2 is then read out to the computer 14 via the host interface (not shown) with a 16-bit pixel vale for each channel. Thus there are two numbers for each polygon, one indicating the red value and the second indicating the green value. When there are less than 32,768 polygon cells to sum, there will be some unused locations in SRAM 74-1, 74-2. The host computer will only read and clear the locations in SRAM 74-1, 74-2 corresponding to active cells being summed.

It may be the case that with a small audience (and proportionally larger cells) a cell can have sufficiently many pixels that there is a possibility that the sum of pixel values for that cell may overflow 16 bits. In this case, during calibration, the cell is split into one or more subcells of less than 256 pixels each. Then during the summing phase, the host computer adds the cell's partial sums after reading them from SRAM 74-1, 74-2.

FIG. 9a shows the polygon summing circuit 60 ("summer") connected between camera 24 and computer 14, with computer 14 driving projector 30 via display card 26.

Where the room is divided up into sectors (see FIG. 9b) several cameras 24-1, 24-2 (additional cameras not shown) are used to cover the auditorium, this sectorization being performed by the host computer 14-1 which then combines data from the various video cameras 24-1, 24-2 each of which has an associated summing circuit 60-1, 60-2 and associated intermediary smaller (less powerful) computer 14-2, 14-3, the computers 14-1, 14-2, 14-3 all being connected by a local area network. In this case there are multiple polygon summing circuits 60-1, 60-2, with one such circuit 60-1, 60-2 for each camera. The host computer 14-1 then determines which camera 24-1, 24-2 could best observe each seat, and assigns to each seat one camera 24-1, 24-2 so as to partition the audience amongst the cameras without overlap. The partitioning procedure for each point, i.e., cell, selects the camera 24-1, 24-2 which has the cell's projection point closest to the center of the camera image. For optimal signal-to-noise ratio in this sectorization process, it is best if there is a minimal brightness difference within an image between the brightest cell and dimmest cell which are in the sector assigned to each camera 24-1, 24-2. Thus the camera imaged area should be relatively uniform in distance from the camera.

If the SRAM 74-1, 74-2 is sufficiently fast, the control component 82 can be modified to zero the appropriate bank at the beginning of a frame, thus relieving the host computer of the task. There will likely be background pixels not assigned to summing cells. The VRAM 78 locations corresponding to those pixels will contain a predetermined cell number, such as zero, whose sums are never cleared or read from SRAM 74-1 and 74-2 by the host computer.

One use of the thus obtained reflector state information (however processed) is to project on the screen 34 using video projector 30 an image viewable by the audience of the seating chart with the state of the reflector associated with each seat displayed in color. The audience members may then find themselves in the image by observing the image while manipulating their individual reflectors.

Another use may be to conduct surveys of the audience, asking them questions of fact and/or opinion and measuring their response. Another use may be to use the states as input to a multiplayer game, dividing the audience into sections, each section assuming the role of one "player" and acting as one by "voting". Another use may be to use the states as input to a music synthesizer, dividing the audience into sections, each section controlling one or more instrument parameters (pitch, volume, etc.).

Many variations are present in accordance with the invention. The above described embodiment is essentially communicating tri-state data: a red reflection, a green reflection, or none (no response). Instead, there may be only two states: reflection or none, or multi-state (additional colors). Instead of colors, the states of the reflectors may be distinguished by being of different polarizations. The reflecting devices may be fluorescent in one or more colors, thus eliminating the need for a visible light source. Instead of visible light, the illumination could be infra-red or other wavelengths, with a corresponding change in the nature of the reflectors. Also, instead of reflectors, each participant could be provided with a self powered light source such as a flashlight.

Also, the scanning may be performed (alternatively to the camera 24 and light 40 of FIG. 2a) by one or more movable (oscillating) mirrors instead of a video camera. In this case, the system includes a laser 90, a mirror light beam deflecting apparatus 92, and a photodetector 94.

This disclosure includes copyrighted material; permission is given for facsimile reproduction of material in Patent Office files, but all other copyright rights are reserved.

The above description is illustrative and not limiting; further modifications will be apparent to one of ordinary skill in the art in light of this disclosure and the appended claims.

I claim:

1. A method for collecting data from at least one person, comprising the steps of:
   providing each person with a radiation source capable of defining at least two states;
   scanning all the radiation sources with a detector thereby determining the state of each scanned source; and
   aggregating the determined states into data.

2. The method of claim 1, wherein the step of scanning comprises using a video camera.

3. The method of claim 1, wherein the step of scanning comprises collecting light with a movable mirror.

4. The method of claim 1, wherein the incident light is polarized, and each source is a polarized reflector defining at least two states of the source by different rotations of the plane of polarization of reflected light.

5. The method of claim 1, wherein the incident light is unpolarized and each source is a polarized reflector defining at least two states of the source by different orientations of the plane of polarization of reflected light.

6. The method of claim 1, wherein each source is fluorescent in at least one color.

7. The method of claim 1, wherein the radiation is infra-red.

8. The method of claim 1, further comprising the steps of:
   providing a plurality of detectors, each detector scanning a predetermined portion of the radiation sources;
   dividing each predetermined portion into a plurality of cells, each cell including only one of the radiation sources; and
   summing an intensity value of the source in each cell, over all the cells.

9. The method of claim 1, wherein each radiation source is a retroreflector for reflecting incident light.

10. The method of claim 9, further comprising the step of providing a source of incident light mounted substantially coaxially with the detector to illuminate the reflectors.

11. The method of claim 9, wherein each retroreflector reflects at least two distinguishable colors, each color defining one state of the source.

12. A method for collecting data from at least one person, comprising the steps of:
- providing each person with a retroreflector capable of defining at least two states; each state characterized by a different color reflection;
- providing a source of light substantially coaxially mounted with a video camera;
- scanning the locations occupied by each person with the video camera, thereby determining the state defined by each retroreflector; and
- aggregating the state of each scanned retroreflector into data.

13. A system for collecting data from at least one person, each person being provided with a source of illumination capable of defining at least two states, comprising:
- a detector for scanning the at least one person thereby determining the state of each scanned source; and
- means for aggregating the states into data.

14. The system of claim 13, wherein each source comprises a retroreflector which reflects at least two distinguishable colors, each color defining at least one state, and wherein the detector comprises a video camera, and further comprising:
- a source of light mounted substantially coaxially with the video camera;
- means for defining a plurality of cells scanned by the video camera, each cell including only one source; and
- means for summing an intensity value of the source in each cell, over all the cells.

15. The system of claim 14, wherein the means for summing includes:
- two video channels, each for receiving a video signal associated with one of the states of the sources;
- an analog to digital converter to digitize the received video signal for each channel;
- a look-up table for correcting the digitized video signal for each channel;
- a latch for storing the corrected digitized video signal for each channel;
- a first memory for storing the latched signal for each channel; and
- a second memory for storing a pixel address associated with the latched signal.

* * * * *